US008825598B2

(12) United States Patent
Albouze

(10) Patent No.: US 8,825,598 B2
(45) Date of Patent: Sep. 2, 2014

(54) MEDIA FILE SYNCHRONIZATION

(75) Inventor: Jean-Francois Albouze, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 12/817,094

(22) Filed: Jun. 16, 2010

(65) Prior Publication Data

US 2011/0313972 A1    Dec. 22, 2011

(51) Int. Cl.
*G06F 7/00* (2006.01)
*G06F 17/00* (2006.01)

(52) U.S. Cl.
USPC ........................................................ 707/624

(58) Field of Classification Search
None
See application file for complete search history.

(56) References Cited

U.S. PATENT DOCUMENTS

| | | | | |
|---|---|---|---|---|
| 5,909,689 | A * | 6/1999 | Van Ryzin ............................ | 1/1 |
| 6,295,541 | B1 * | 9/2001 | Bodnar et al. ....................... | 1/1 |
| 6,687,878 | B1 | 2/2004 | Eintracht et al. | |
| 7,349,913 | B2 | 3/2008 | Clark et al. | |
| 7,508,419 | B2 | 3/2009 | Toyama et al. | |
| 7,680,849 | B2 * | 3/2010 | Heller et al. ................... | 707/621 |
| 2006/0041601 | A1 * | 2/2006 | Kim et al. ...................... | 707/201 |
| 2006/0253501 | A1 * | 11/2006 | Langan et al. ................. | 707/201 |
| 2009/0029693 | A1 * | 1/2009 | Liwell et al. .................. | 455/419 |
| 2010/0138887 | A1 * | 6/2010 | Nakata .......................... | 725/110 |
| 2011/0258434 | A1 * | 10/2011 | Qiu et al. ...................... | 713/153 |
| 2011/0258454 | A1 * | 10/2011 | Qiu et al. ...................... | 713/176 |

FOREIGN PATENT DOCUMENTS

EP    2134122 A1 * 12/2009

OTHER PUBLICATIONS

Lucistnik, FreeBSD Handbook Ch 32: Advanced Networking, verified equivalent information as of Oct. 31, 2007 via Archive.org, FreeBSD.org, http://www.freebsd.org/doc/en_US.ISO8859-1/books/handbook/network-bluetooth.html.*
Transmission Control Protocol, Sep. 1981, Information Sciences Institute, RFC 793, pp. i-83 (found on http://www.ietf.org/rfc/rfc793.txt).*
Harrison, CDIA Training and Test Preparation Guide, Specialized Solutions, 2000, p. 68-70.*
U.S. Appl. No. 61/324,571.*

* cited by examiner

*Primary Examiner* — Jason Liao
(74) *Attorney, Agent, or Firm* — Wong, Cabello, Lutsch, Rutherford & Brucculeri, LLP

(57) ABSTRACT

Among other things, methods, systems and computer program products are disclosed for manipulating media. In one aspect, synchronization of media files involves identifying a change to an attribute associated with a media file associated with a first media file library located on the host system; accessing a client device list including device IDs for devices associated with the first media file library; identifying a first client device indicated by the device list; accessing a first synchronization order file stored on a server system; modifying the first synchronization order file to indicate the change to the attribute associated with the media file; and providing the modified first synchronization order file to the server system to enable the first client device to apply the indicated change to the attribute associated with the media file within a second media file library located on the first client device.

31 Claims, 6 Drawing Sheets

MEDIA FILE SYNCHRONIZATION

BACKGROUND

This application relates to managing, sharing, and distributing, digital media files and information associated with digital media files, including digital still image files and/or digital video image files. For example, media files can be imported from a media device (e.g., a digital camera or video recorder) into a computer system. Other imports can occur from computer to computer, such as copying a subset of media files from a user's folder of raw media files to a different folder. As another example, media files can be copied from a personal computer to a mobile device, such as a mobile phone, personal digital assistant (PDA), or personal gaming device.

Media files can be distributed between devices connected to a network. For example, a personal computer can send a request for a media file to a web server. The web server can provide the requested media file to the personal computer in response to the request. In some cases, media files can be shared between end user devices on a network. This type of media file sharing can be referred to as Peer-to-Peer sharing. For example, a user of a first computer can share digital still image files with a user of a second computer through a computer network.

In some situations, information (e.g., metadata) can be associated with digital media files. For example, captions can be associated with digital still image files. As another example, title and chapter information can be associated with a digital video image file.

SUMMARY

Methods, systems and computer program products are described for synchronizing media files and information associated with media files. Implementations can optionally include one or more of the following features.

Facilitating the synchronization of media libraries among two or more devices may involve identifying a change to an attribute associated with a media file, where the media file is associated with a first media file library located on the host system; accessing a client device list that includes device IDs for client devices associated with the first media file library; identifying a first client device indicated by the device list; modifying a first synchronization order file specific to the identified first client device and stored on a server system to indicate the identified change to the attribute associated with the media file; and providing the modified first synchronization order file to the server system to enable the first client device to access the first synchronization order file and apply the indicated change to the attribute associated with the media file within a second media file library located on the first client device.

Accessing the device list may include retrieving the device list from the server system and/or transmitting a lock order to the server system to lock the device list for editing by the host system.

Accessing the first synchronization order file may include transmitting a lock order to the server system to lock the first synchronization order file for editing by the host system.

Providing the modified first synchronization order file to the server system may include transmitting a lock release order to the server system to unlock the first synchronization order file.

Facilitating synchronization may further include transmitting a notification to the first client device notifying the first client device to access the first synchronization order file.

Facilitating synchronization may further include receiving an indication of the first synchronization order file having been received by the first client device; and removing the indication of the change to the attribute associated with the media file from the first synchronization order file responsive to receiving the indication of the first synchronization order file having been received.

Facilitating synchronization may further include, prior to providing the modified first synchronization order file, identifying a change to an attribute associated with a second media file; and updating the first synchronization order file to include an indication of the change to the attribute associated with the second media file.

Facilitating synchronization may further include, accessing a second synchronization order file stored on the server system, that is specific to the host system, where the second synchronization order file includes an indication of a change to an attribute associated with a second media file, where the second media file is associated with both the first and second media file libraries; and applying the indicated change to the attribute associated with the second media file within the first media file library.

Accessing the second synchronization order file may include transmitting a lock order to the server system to lock the first synchronization order file for use by the host system.

Facilitating synchronization may further include, modifying the second synchronization order file to remove the indication of the change to the attribute associated with the second media file from the second synchronization order file; and providing the modified second synchronization order file to the server system.

The indication of the change to the attribute associated with the second media file may be added to the second synchronization order file by the first client device.

The second synchronization order file may include indications of changes to attributes associated with media files that have been added to the second synchronization order file by at least two devices, the two devices being different from the host system.

The change to the attribute may constitute a change to metadata associated with the media file.

Facilitating synchronization may further include, accessing a synchronization order file for each device indicated by the device list as being associated with the first media library; modifying each of the accessed synchronization order files to indicate the change to the attribute associated with the media file; and providing the modified synchronization orders to the server system to enable the respective associated devices to access their respective modified synchronization order files and apply the indicated change to the attribute associated with the media file within a media file library located on each device.

Facilitating synchronization may further include, determining that a value associated with the first synchronization order file exceeds a predetermined threshold; and in response to the determining, generating a download order that is specific to the first client device, where the download order indicates that one or more media files are to be downloaded by the first client device.

Determining that a value associated with the first synchronization order file exceeds a predetermined threshold may include determining that a number of changes to attributes associated with media files included in the first synchronization order file exceeds a predetermined threshold.

Determining that a value associated with the first synchronization order file exceeds a predetermined threshold may include determining that an amount of memory storage space required to store the first synchronization order file exceeds a predetermined threshold.

The first synchronization order file may include one or more additional indications of changes to attributes associated with one or more media files where the one or more additional indications of changes to attributes associated with one or more media files were added to the first synchronization order file by one or more devices other than the host system.

Facilitating synchronization may further include, determining that an indication of the first synchronization order having been received by the server system has not been received within a predetermined time-out period; and re-transmitting the first synchronization order to the server system responsive to the determining.

In another aspect, facilitating the synchronization of media libraries among two or more devices may involve, detecting that a first portable electronic device is within a predefined communications proximity relative to the host computer system; establishing wireless communications with the first portable electronic device; receiving an indication of a device ID associated with the first portable electronic device from the first portable electronic device; accessing a device list that includes device IDs for devices associated with a first media file library located on the host computer system; identifying the first portable electronic device as being associated with the first media file library using the received device ID and the device list; modifying a first synchronization order file that is specific to the first portable electronic device to indicate a change to an attribute associated with a media file, where the media file is associated with the first media file library; and transmitting the first synchronization order file to the first portable electronic device to enable the first portable electronic device to apply the indicated change to the attribute associated with the media file within a second media file library located on the first portable electronic device.

Facilitating synchronization may further include, receiving security information from the first portable electronic device; and using the received security information to determine that the first portable electronic device is permitted to receive synchronization order files associated with the first media file library.

The first synchronization order file may be transmitted to the first portable electronic device in response to an access request received from the first portable electronic device.

Facilitating synchronization may further include, receiving a modified first synchronization order file from the first portable electronic device, where the indication of the change to the attribute associated with the media file has been removed from the modified first synchronization order; and storing the modified first synchronization order in a memory of the host computer system.

Facilitating synchronization may further include, prior to transmitting the first synchronization order file, receiving an access request from a second portable electronic device, and allowing the second portable electronic device to modify the first synchronization order file in response to the received access request; where the second portable electronic device modifies the first synchronization order file to indicate a change to an attribute associated with a second media file.

Facilitating synchronization may further include, receiving an access request from the first portable electronic device, where the access request indicates a second synchronization order file; allowing the first portable electronic device to modify the second synchronization order file to indicate a change to an attribute associated with a second media file in response to the received access request, where the second media file is associated with both the first and second media file libraries; accessing the second synchronization order file to identify the indication of the change to the attribute associated with the second media file; and applying the indicated change to the second media file within the first media file library.

Facilitating synchronization may further include, accessing a synchronization order file for each device indicated by the device list as being associated with the first media library that is within a predefined communications proximity relative to the host computer system, modifying each of the accessed synchronization order files to indicate the change to the attribute associated with the media file; and transmitting the modified synchronization order files to the respective associated devices to enable each device to apply the indicated change to the attribute associated with the media file within a media file library located on each device.

Facilitating synchronization may further include, determining that a value associated with the first synchronization order file exceeds a predetermined threshold; in response to the determining, generating a download order that is specific to the first portable electronic device, where the download order indicates that one or more media files are to be downloaded by the first portable electronic device; and transmitting the download order to the second device.

Determining that a value associated with the first synchronization order file exceeds a predetermined threshold may include determining that a number of changes to attributes associated with media files included in the first synchronization order file exceeds a predetermined threshold.

Determining that a value associated with the first synchronization order file exceeds a predetermined threshold may include determining that an amount of memory storage space required to store the first synchronization order file exceeds a predetermined threshold.

In another aspect, a system configured to facilitate synchronization of media files among two or more devices may include, an intermediate server configured to host a synchronization order file that facilitates synchronization of a host media library with at least one other media library; and a host device that hosts the host media library. The host device may be configured to execute processes to perform steps of detecting that information associated with one or more media files within the host media library has changed; communicating with the intermediate server to temporarily prevent the synchronization order file from being altered by entities other than the host device; modifying the synchronization order file to reflect the detected changed information; and communicating with the intermediate serve to allow the synchronization order file to be altered by entities other than the host device.

The system may further include a client device that maintains a client media library and that is configured to communicate with the intermediate server to access the synchronization order file and to use information stored therein to synchronize the client media library with the host media library.

In another aspect, an article embodying machine readable medium may include instructions that when executed may cause one or more machines to perform operations including, identifying a change to an attribute associated with a media file, where the media file is associated with a first media file library located on a host system; accessing a client device list that includes device IDs for devices associated with the first media file library; identifying a first client device indicated by the device list; accessing a first synchronization order file stored on a server system, that is specific to the first client device, using an identified device ID for the first client device, modifying the first synchronization order file to indicate the change to the attribute associated with the media file; and providing the modified first synchronization order file to the server system to enable the first client device to access the first synchronization order file and apply the indicated change to the attribute associated with the media file within a second media file library located on the first client device.

The subject matter described in this specification can potentially provide one or more of the following advantages. Media files, information associated with media files, and/or media file libraries can be securely and efficiently synchronized between electronic devices. Media files can be synchronized only with devices that are allowed access to specified media file libraries. Conflicts between changes to media files can be resolved. Media files and media file libraries stored on devices within relative proximity to each other can be efficiently synchronized. Media files, information associated with media files, and media file libraries can be synchronized between electronic devices without the need for specialized server software.

The subject matter described in this specification can be implemented as a method or as a system or using computer program products, tangibly embodied in computer readable medium, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

BRIEF DESCRIPTION OF THE DRAWINGS

Like reference symbols and designations in the various drawings indicate like elements.

DETAILED DESCRIPTION

Techniques, apparatus, systems and computer program products are described for synchronizing information associated with media files stored in media file libraries between two or more devices. A host system can identify that information (e.g., metadata) associated with a media file has been changed. The host system can access a synchronization (sync) order file associated with a client device and modify the sync order file to indicate that information (e.g., metadata) associated with a media file has been changed. The host system can send a lock order to an intermediate server to lock the sync order file so that only the host system is allowed to edit the sync order file. The host system can provide the modified sync order file to the server system and release the lock on the sync order file. The client device can access the sync order file to apply the indicated change to the information associated with the media file. The client device can edit the sync order file to remove the indication to the change to the information associated with the media file from the sync order file.

Figure 1:
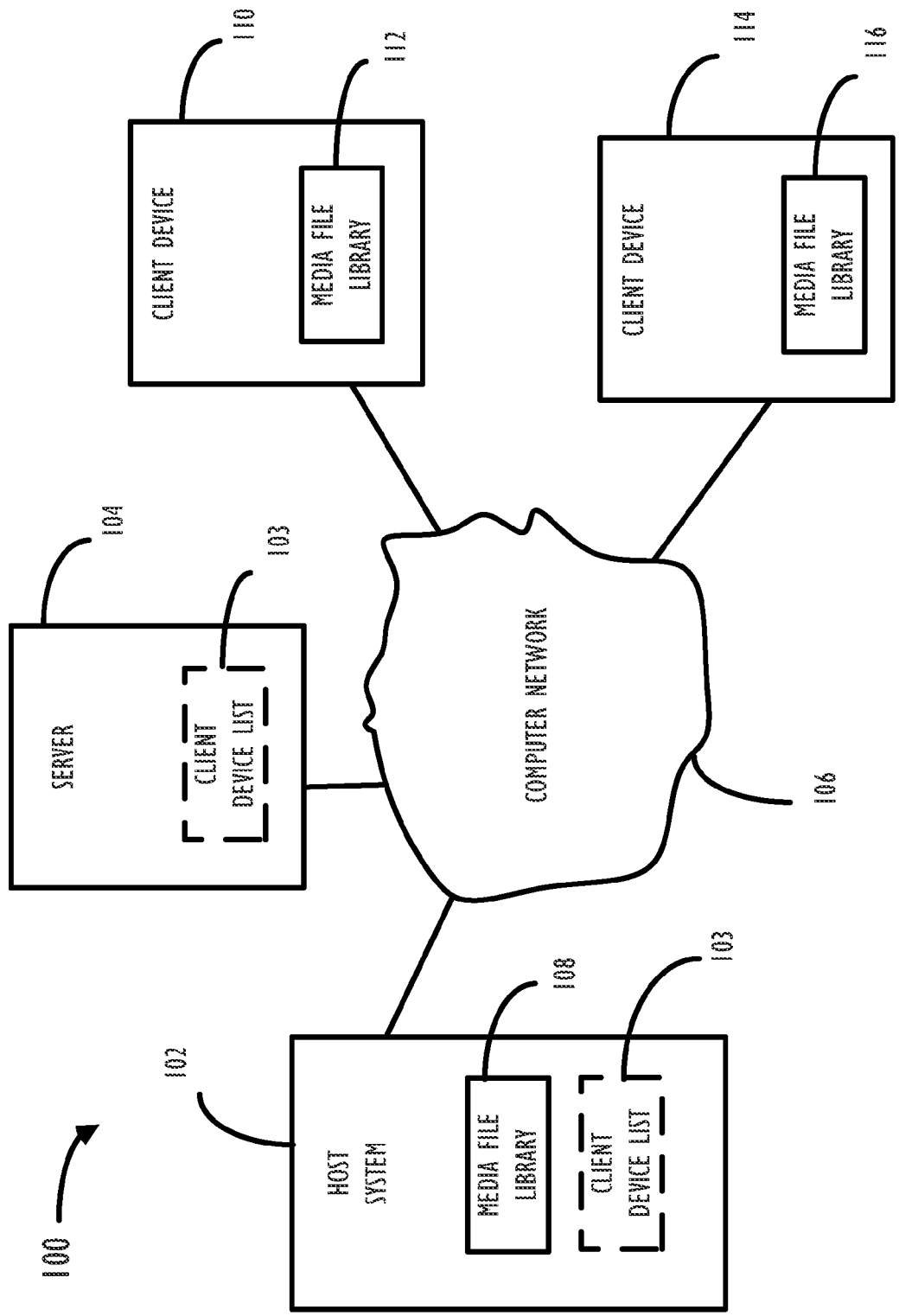
FIG. 1 shows an example system for media file library synchronization.

FIG. 1 shows an example system 100 for media file library synchronization. The system 100 includes a host system 102 in communication with a server 104 through a network 106 (e.g., the Internet, a LAN, or a WAN). The host system 102 can be, for example, a personal computer (e.g., desktop or laptop computer), a web enabled TV, a media server device (e.g., an Apple TV), a gaming console, or a network server. In some alternative implementations, the host system 102 can be a mobile device, such as, for example, a smart phone, a personal digital assistant (PDA), or a personal gaming device.

The host system 102 includes a media file library 108 that includes one or more media files. In some implementations, the media files can be digital still images (e.g., photos or pictures stored as jpeg, bitmap, gif, tiff, jfif, or png files), digital video files (e.g., mv4, mpeg, mov, divx, or wmv files), or a combination of both. In other implementations, the media files can additionally include audio files (e.g., mp3, wave, flac, aac, m4p, or wma files). In some implementations, the media files can include slide shows that include multiple digital still images or videos. In some implementations, the host system 102 can include multiple computers or systems in communication with each other with each of the multiple computers or systems storing a portion of the media file library 108. In some implementations, the media file library 108 can be stored on one or more hard drives or servers in communication with the host system 102.

In some implementations, the host system 102 can be connected to a display device for presenting the media files to one or more users. For example, the host system 102 can be connected to a computer monitor or television. As another example, the host system 102 can include one or more built in monitors for displaying media files. In implementations in which the media files are digital still images, the host system 102 can be configured to display the digital still images as a slide show. In some implementations, the host system 102 can play audio while displaying the digital still images. In implementations in which audio is played along with digital still images, or in which the media files include video or audio files, the host system 102 can be connected to speakers for playing audio associated with the media files. In some implementations, the host system 102 is not connected to a display device for presenting the media files. In some such implementations, the host system 102 can server as a repository for storing and organizing the media files within the media file library 108.

In some implementations, some or all of the media files contained within the media file library 108 are associated with metadata. For example, digital still images can be associated with metadata including captions, tags that indicate persons pictured in images, rating information, geo-location data (e.g., latitude and longitude, GPS data, or city and country data), date and/or time stamps, image resolution information, or file size information. Digital still images can additionally be associated with visual effect information indicating one or more visual effects (e.g., black and white effect, filtering effect, etc.) that have been applied to a digital still image.

As another example, digital video files can be associated with metadata including, captions, titles, chapter titles, run time, rating information, artist name(s), actor names, names of other persons associated with the video (e.g., director, or producer), television series names, descriptions, genres, video artwork, date and/or time stamps, image resolution information, or file size information. As yet another example, audio files can be associated with metadata including descriptions, song titles, album titles, genres, rating information, artist name(s), names of other entities associated with the audio file (e.g., producer, record label), album artwork, date and/or time stamps, or file size information.

A user of the host system 102 can edit metadata associated with a media file stored in the media file library 108. For example, the user can add a caption to a digital still image or change a title of a digital video file. As another example, the user can assign a rating to an audio file. The host system 102 can detect the change to the metadata associated with the media file.

The host system 102 can identify one or more client devices that are associated with the media file library 108 in order to propagate the change to the metadata associated with the media file to the one or more client devices. In some implementations, the host system 102 can access a device list 103 of devices associated with the media file library 108 in order to identify devices to which to propagate the change to the metadata associated with the media file. The host system 102 can use the device list 103 to identify one or more devices associated with the media file library 108. As shown in FIG. 1 and indicated by the dashed box, in some implementations, the device list 103 can be stored on the host system 102. In some implementations, the device list 103 can be stored on the server 104.

In some implementations, the host system 102 can access the device list 103 by sending an access request to the server 104. The access request can include an indication of the media file library 108 (e.g., a media file library ID, or file name for the media file library 108). The server 104 can use the received indication of the media file library 108 to identify the device list 103 associated with the media file library 108 and provide the device list 103 to the host system 102. In some implementations, the access request can include an indication of the device list 103 (e.g., a device list ID, or a file name for the device list 103). The server 104 can provide the device list 103 indicated in the access request to the host system 102.

In some implementations, the host system 102 can send a lock order to the server 104 indicating that the device list 103 is to be locked for editing by the host system 102. In some implementations, the lock order can be included in the access request. In some implementations, the lock order can be sent independently of the access request. Locking the device list 103 can allow the host system 102 to access information included in the device list 103 while preventing other devices from modifying the device list 103.

In the example shown, the host system 102 can identify a client device 110 as being associated with the media file library 108 using the device list 103. For example, the client device 110 can include a media file library 112 that is associated with the media file library 108. In some instances, the media file library 112 can be a mirror of the media file library 108. In other instances, the media file library 112 can include a subset of the media files included in the media file library 108. In some instances, the media file library 112 can include some media files that are also included in the media file library 108 and other media files that are not included in the media file library 108.

In some implementations, the client device 110 can include additional media file libraries that are not associated with the media file library 108. In some implementations, the device list 103 can include device IDs for devices associated with the media file library 108. The device IDs can take the form of hardware IDs, network addresses, IP addresses, telephone numbers, or other unique or semi-unique identifiers used to identify devices that are associated with the media file library 108. For example, the host system 102 can use the device list 103 to identify a hardware ID for the client device 110.

In some implementations, the client device 110 registers with the server 104 in order to be added to the device list 103. For example, the client device 110 can indicate to the server 104 that the client device 110 includes the media file library 112 that is associated with the media file library 108. By being registered on the device list 103, the client device 110 can access sync order files located on the server 104 that indicate changes to files or information associated with files that are associated with the media file library 108. In some implementations, the client device 110 can provide a device ID to the server 104 when registering with the server 104 in order to be added to the device list 103.

In some implementations, the client device 110 can access the device list 103 in order to be added to the device list 103. For example, the client device 110 can transmit an access request to the server 104 to request access to the device list 103. The access request can include an indication of the device list 103 or an indication of the media file library 108 as described above. In some implementations, the server 104 provides access to the device list 103 by transmitting the device list 103 to the client device 110. The client device 110 can modify the device list 103 to include an indication of the client device 110. In some implementations, the client device 110 can modify the device list 103 to include a device ID for the client device 110. The device ID can take the form of a hardware ID, network address, IP address, telephone number, or other unique or semi-unique identifier for the client device 110.

In some implementations, the client device 110 can send a lock order to the server 104 to lock the device list 103 for editing by the client device 110. The lock order can be included in the access request or transmitted independently of the access request. The server 104 can lock the device list 103 for editing by the client device 110 in order to prevent other devices from modifying the device list 103 while the client device 110 is editing the device list 103. In some implementations, after the client device 110 has edited the device list 103, the client device 110 can transmit the modified device list 103 to the server 104. In some implementations, the client device 110 can transmit a lock release order to the server 104 after editing the device list 103 to unlock the device list 103. The server 104 can unlock the device list 103 in response to the lock release order. The unlocked device list 103 can then be accessed by other devices.

In some implementations, an indication of the client device 110 (e.g., a device ID) can be added to the device list 103 by a device other than the client device 110. For example, the host system 102 can access the device list 103 and modify the device list 103 to include an indication of the client device 110. As another example, a user of the host system 102 may wish to allow a user of the client device 110 to access files stored in the media file library 108. The user of the host system 102 can cause the host system 102 to add an indication of the client device 110 to the device list 103.

In some implementations, the client device 110 must provide credentials in order to access the device list 103. For example, the client device 110 can provide a user name and password in order to access the device list 103 and add an indication of the client device 110 to the device list 103. As another example, the client device 110 can provide a security key to access the device list 103 and add an indication of the client device 110 to the device list 103.

Upon identifying the client device 110 as being associated with the media file library 108, the host system 102 can access a synchronization (sync) order file associated with the client device 110 in order to add an indication of the change to the metadata associated with the media file to the sync order file. In some implementations, the sync order file is specific to the client device 110. In some implementations, the sync order file is stored on the server 104. The host system 102 accesses the sync order file by sending an access request to the server 104. The access request can include an indication of the client device 110 retrieved from the device list 103 (e.g., a device ID for the client device 110). In some implementations, the access request can include a file name or sync order file ID for the sync order file associated with the client device 110. The server 104 can provide the requested sync order file to the host system 102 in response to the access request. In some implementations, the host system 102 can send a lock order to the server 104 to lock the sync order file. The lock order can be included in the access request or sent independently of the access request. The server 104 can lock the sync order file for editing by the host system 102 in response to the lock order. This can prevent other devices from editing the sync order file while the host system 102 is accessing the sync order file.

The host system 102 can edit the sync order file to include an indication of the media file (e.g., a file name, or file ID) as well as information to allow the client device 110 to apply the change to the metadata associated with the media file to a copy of the media file stored within the media file library 112. For example, the sync order file can indicate that the name of the media file is "summer_trip_pic__1.jpg" and that a caption of "At the cabin with the family" has been added to the media file. In some implementations, an indication of the device that modified the sync order file can be added to the sync order file. For example, the host system 102 can modify the sync order file to include a device ID, a hardware ID, a network address, an IP address, a telephone number, or other unique or semi-unique identifier associated with the host system 102.

In some implementations, the sync order file can include an indication of the media file library 108. For example, the sync order file can include a name, media file library ID, or file name for the media file library 108 to indicate that the media file indicated in the sync order file is a part of the media file library 108. In some implementations, the host system 102 can add a time stamp to the sync order file to indicate when the sync order file was modified to include the indication of the change to the metadata associated with the media file or when the metadata associated with the media file was changed. In some implementations, the sync order file can include an indication of a destination system for the sync file.

In some implementations, if a sync order file for the client device 110 does not exist, a sync order file for the client device 110 can be generated. In some implementations, the host system 102 can generate the sync order file. In some implementations, the sync order file can be generated by the client device 110 or the server 104. The upon generation of the sync order file, the host system 102 can modify the sync order file to include information to allow the client device 110 to apply the change to the metadata associated with the media file as described above.

After modifying or generating the sync order file, the host system 102 can transmit the sync order file to the server 104 through the network 106. In some implementations, upon receiving the sync order file, the server 104 can transmit a response message to the host system 102 to indicate that the sync order file was successfully received. In some implementations, the host system 102 can re-transmit the sync order file to the server 104 if a response message has not been received within a predetermined time out period. In some implementations, upon receiving a response message, the host system 102 can delete the sync order file from a local memory of the host system 102.

In some implementations, the server 104 can replace a version of the sync order file stored on the server 104 with the modified version of the sync order file received from the host system 102. In some implementations, the host system 102 can transmit a lock release order to the server 104 to unlock the sync order file to allow other devices to access the sync order file. The server 104 can unlock the sync order file in response to the lock release order. In some implementations, the host system 102 can transmit the lock release order along with the modified sync order file. In some implementations, the host system 102 can transmit the lock release order independently of the modified sync order file. In some implementations, the host system 102 does not transmit the lock release order until after a response message indicating that the server 104 has successfully received the modified sync order file is received from the server 104.

In some implementations, the client device 110 can access the sync order file that includes the indication of the change to the metadata associated with the media file. In some implementations, the client device 110 can access the sync order file on a regular basis. In some implementations, the client device 110 must wait until the sync order file is in an unlocked state before accessing the sync order file. In some implementations, the client device 110 can access the request in response to a notification. For example, the host system 102 can send a notification to the client device 110 to indicate to the client device 110 that the client device 110 is to access the sync order file. In some implementations, the client device 110 can receive the notification from a push notification server. In some implementations, the server 104 can act as the push notification server.

In some implementations, the client device 110 can access the file by sending an access request to the server 104 as described above for the host system 102. For example, the client device 110 can send an access request that includes a file name for the sync order file and a request to access the sync order file. The server 104 can provide the sync order file to the client device 110 in response to the access request. In some implementations, the client device 110 can send a lock order to the server 104 to cause the server to lock the sync order file to exclude other devices from editing the sync order file while the client device 110 is accessing the sync order file.

The client device 110 can receive the sync order file modified by the host system 102 and transmitted by the server 104 through the computer network 106. The client device 110 can then extract information from the sync order file in order to apply the change to the metadata associated with the media file. For example, the received sync order file can indicate that "John" and "Stacey" have been tagged in a digital still image having a file name "spring_photos__132.gif." The client device 110 can then apply the indicated change to a version of the digital still image stored in the media file library 112. As another example, the received sync order file can indicate that a black and white effect has been applied to a digital still image having a file name "prom_picture__1.jpg." The client device 110 can identify the digital still image within the media file library 112 and apply the indicated black and white effect to the digital still image.

In some implementations, the sync order file can include indications of additional changes made to the media file, or indications of changes made to other media files. The additional indications may have been previously added by the host system 102 or by one or more other devices (e.g., a client device 114) associated with the media file library 108. In some implementations, when the client device 110 accesses the sync order file, the client device 110 can implement each of the changes to media files indicated in the sync order file. In some implementations, upon implementing the change to the metadata associated with the media file, the client device 110 can delete the indication of the change to the metadata associated with the media file from the sync order file.

In some implementations, the client device 110 can provide a modified version of the sync order file to the server 104. For example, the client device 110 can modify the sync order file by deleting an indication of a change to a media file from the sync order file. The client device 110 can then send the modified sync order file to the server 104. The server 104 can receive the modified sync order file. In some implementations, the server 104 can replace a previous version of the sync order file with the modified sync order file received from the client device 110.

In some implementations, upon receiving the sync order file, the server 104 can transmit a response message to the client device 110 to indicate that the sync order file was successfully received. In some implementations, the client device 110 can re-transmit the sync order file to the server 104 if a response message has not been received within a predetermined time out period. In some implementations, upon receiving a response message, the client device 110 can delete the sync order file from a local memory of the client device 110.

In some implementations, the client device 110 can transmit a lock release order to the server 104 to unlock the sync order file to allow other devices to access the sync order file. The server 104 can unlock the sync order file in response to the lock release order. In some implementations, the client device 110 can transmit the lock release order along with the modified sync order file. In some implementations, the client device 110 can transmit the lock release order independently of the modified sync order file. In some implementations, the client device 110 does not transmit the lock release order until after a response message indicating that the server 104 has successfully received the modified sync order file is received from the server 104.

In some implementations, upon detecting a change to information associated with a media file, a device can modify sync order files for all devices associated with the media file to allow the devices to apply the change to the information associated with the media file. For example, the user of the client device 110 can add a caption to a digital still image that is included in the media file library 112. The client device 110 can detect the change to the metadata associated with the digital still image and access a device list 103 stored on the server 104 as described above in order to identify all devices associated with the digital still image. For example, the client device 110 can send an access request for the device list 103 of devices associated with the media file library 108 and a lock order to lock the device list 103. The server 104 can lock the device list 103 from being edited by any devices other than the client device 110 and provide the device list 103 to the client device 110.

In this example, the client device 110 can use the device list 103 to identify that the host system 102, and a client device 114 are associated with the digital still image. For example, the client device 114 can include a media file library 116 that is associated with the media file library 108 and the media file library 112.

The client device 110 can determine that the change to the metadata associated with the digital still image has not yet been propagated to the host system 102 and the client device 114 and access sync order files for each of these two devices as described above. For example, the sync order files can be stored on the server 104. The client device 110 can request access to the sync order files associated with the host system 102 and the client device 114 and send lock orders for each of the sync order files. The server 104 can lock the sync order files for editing by the client device 110 and provide the sync order files to the client device 110. In some implementations, the client device 110 can use device IDs for the host system 102 and the client device 114 extracted from the device list 103 to identify and access the sync order files that are specific to the host system 102 and the client device 114.

The client device 110 can modify the sync order files associated with the host system 102 and the client device 114 to indicate the change to the metadata associated with the digital still image. The client device 110 can then provide the modified sync order files to the server 104. The server 104 can replace previous versions of the sync order files with the modified versions of the sync order files. In instances in which the client device 110 has requested that the sync order files be locked for editing, the client device 110 can send a lock release order to the server 104 to unlock the sync order files after the client device 110 has modified the sync order files.

The host system 102 and client device 114 can access their respective sync order files as described above and add the caption to the indicated digital still image file stored within the media file library 108 and the media file library 116 so that the digital still image is synchronized between the media file libraries 108, 112, and 116. For example, the host system 102 can send an access request to the server 104 indicating the sync order file associated with the host system 102. The host system 102 can additionally send a lock order to lock the sync order file associated with the host system 102. The server 104 can lock the sync order file associated with the host system 102 so that only the host system 102 can modify the sync order file and provide the sync order file to the host system 102.

The host system 102 can identify the indication of the change to the metadata associated with the digital still image, apply the indicated caption to the still image within the media file library 108, and remove the indication of the change to the metadata associated with the digital still image from the sync order file. The host system 102 can then return the modified sync order file to the server 104 along with a lock release order. The server 104 can overwrite a previous version of the sync order file with the modified sync order file received from the host system 102 and unlock the sync order file to allow other devices to access the sync order file.

In some implementations, the host system 102 and the client device 114 can access their respective sync order files at regular intervals. In some implementations, the host system 102 and client device 114 can access their respective sync order files in response to received notifications as described above.

In some implementations, the sync order files accessed by the host system 102 and the client device 114 can include additional indications of changes to media files. For example, in addition to being modified by the client device 110 to indicate the change to the metadata associated with the digital still image, sync order files can include an indication of a change to a digital video file made by another client device (not shown). Upon accessing their respective sync order files, the host system 102 and the client device 114 can apply the changes to the digital still image and the digital video file as indicated by the sync order files.

In some implementations, a change to information associated with a media file can replace a previously indicated change to information associated with the media file within a sync order file. For example, the host system 102 can access a sync order file for the client device 110 in order to indicate that a caption for a digital still image has been changed to "July 4$^{th}$ fireworks." The host system 102 can determine that the sync order file already includes an indication of a change to the caption for the digital still image. The host system 102 can replace the indication of the change to the caption within the sync order file with an indication of the new change to the caption of "July 4$^{th}$ fireworks." This ensures that the correct caption for the digital still image is applied to the digital still image within the media file library 112 of the client device 110.

In some implementations, the host system 102 can be responsible for propagating changes to media files to client devices. For example, if a change occurs to a media file on the client device 110, the client device 110 can identify the host system 102 as being associated with the media file as described above and modify the sync order file associated with the host system 102 to include an indication of the change to the metadata associated with the media file as described above. The host system 102 can access the sync order file, apply the change to the metadata associated with the media file to the media file within the media file library 108, and then propagate the change to other devices associated with the media file library 108.

For example, after identifying the indication of the change to the metadata associated with the media file within the sync order file associated with the host system 102, the host system 102 can access the device list 103 as described above and identify the client device 114 as being associated with the media file library 108. The host system 102 can then access the sync order file associated with the client device 114 and modify it to include an indication of the change to the metadata associated with the media file. This process allows the host system 102 to propagate a change made on the client device 110 to the client device 114 (as well as other devices associated with the media file library 108).

In some implementations, the host system 102 (or another device) can determine that a synchronization order intended for a device is too large. In some such implementations, the host system 102 can send a download order to the client device that indicates that one or more media files are to be downloaded by the client device. For example, a user of the host system 102 can edit a digital video file such that the changes to the digital video file are substantial. The host system 102 can identify the client device 110 as being associated with the digital video file. In some instances, host system 102 can determine that the memory space required to indicate the changes to the digital video file exceeds a predetermined threshold. In such instances, the server 104 can transmit a download order to the client device 110 indicating that the client device 110 should download the current version of the digital video file rather than apply the changes to the digital video file. In some implementations, the download order can be added to the sync order file for the client device 110 stored on the server 104 by the host system 102. In some implementations, the download order can be sent directly to the client device 110 by the host system 102. In some implementations, the client device 110 can download the current version of the digital video file from the server 104. In some implementations, the client device 110 can download the current version of the digital video file form the host system 102.

As another example, the sync order file associated with the client device 110 can include indications of several changes to media files. In this example, the host system 102, the server 104, or another device, can determine if the number of changes to media files indicated by the sync order file intended for the client device 110 exceeds a predetermined threshold (e.g., 10). If the number off changes to media files indicated by the sync order file for the client device 110 exceeds the threshold, the host system 102 can provide a download order to the client device 110 indicating that the client device 110 should download current versions of the media files rather than apply the changes to the media files. In some implementations, the host system 102 can determine the number of changes indicated for each media file, and only send a download order when the number of changes associated with a single media file exceeds a predetermined threshold.

In some implementations, the download order can be added to the sync order file for the client device 110 stored on the server 104 by the host system 102. In some implementations, the download order can be sent directly to the client device 110 by the host system 102. In some implementations, the host system 102 can send a down load order to the client device 110 if the size of the sync order file or the size of the indications of the changes to the media files included in the sync order file exceeds a predetermined threshold.

In some implementations, if the number of changes to media files indicated by a sync order file associated with a device exceeds a threshold, or the size of a sync order file associated with a device exceeds a threshold, the sync order file can be replaced by a download order indicating to the device that the entire media file library 108 should be re-downloaded by the device. In some implementations, rather than replacing the sync order file with a download order, the download order can be inserted into the sync order file.

In some implementations, two different devices can make a change to the same media file. For example, a digital still image can be included in both the media file library 108 and the media file library 112. The users of both the host system 102 and the client device 110 can apply a caption to the digital still image. The client device 110 can modify a sync order file associated with the host system 102 indicating the caption for the digital still image. The host system 102 can access the sync order file associated with the host system 102 and perform conflict resolution to determine which change to the caption for the digital still image should be propagated to devices associated with the digital still image to ensure that all versions of the digital still image are synchronized.

For example, the host system 102 can access time stamp information included in the sync order file to determine that the user of the client device 110 applied the change to the caption of the digital still image most recently. The host system 102 can determine that the change to the caption made by the user of the client device 110 takes priority since it occurred most recently. The host system 102 can then apply the change to the caption of the digital still image within the media file library 108 and identify the client device 114 as being associated with the digital still image and modify a sync order file for the client device 114 to indicate the change to the caption made by the user of the client device 110. The client device 114 can then access the sync order file and apply the caption entered by the user of the client device 110 to the digital still image within the media file library 116.

In some implementations, other forms of conflict resolution can be used to determine which change to the caption of the digital still image takes priority. For example, the host system 102 can be identified as a priority system, and the change to the caption made by the user of the host system 102 can be identified as taking priority over the change to the caption made by the user of the client device 110.

Figure 2:
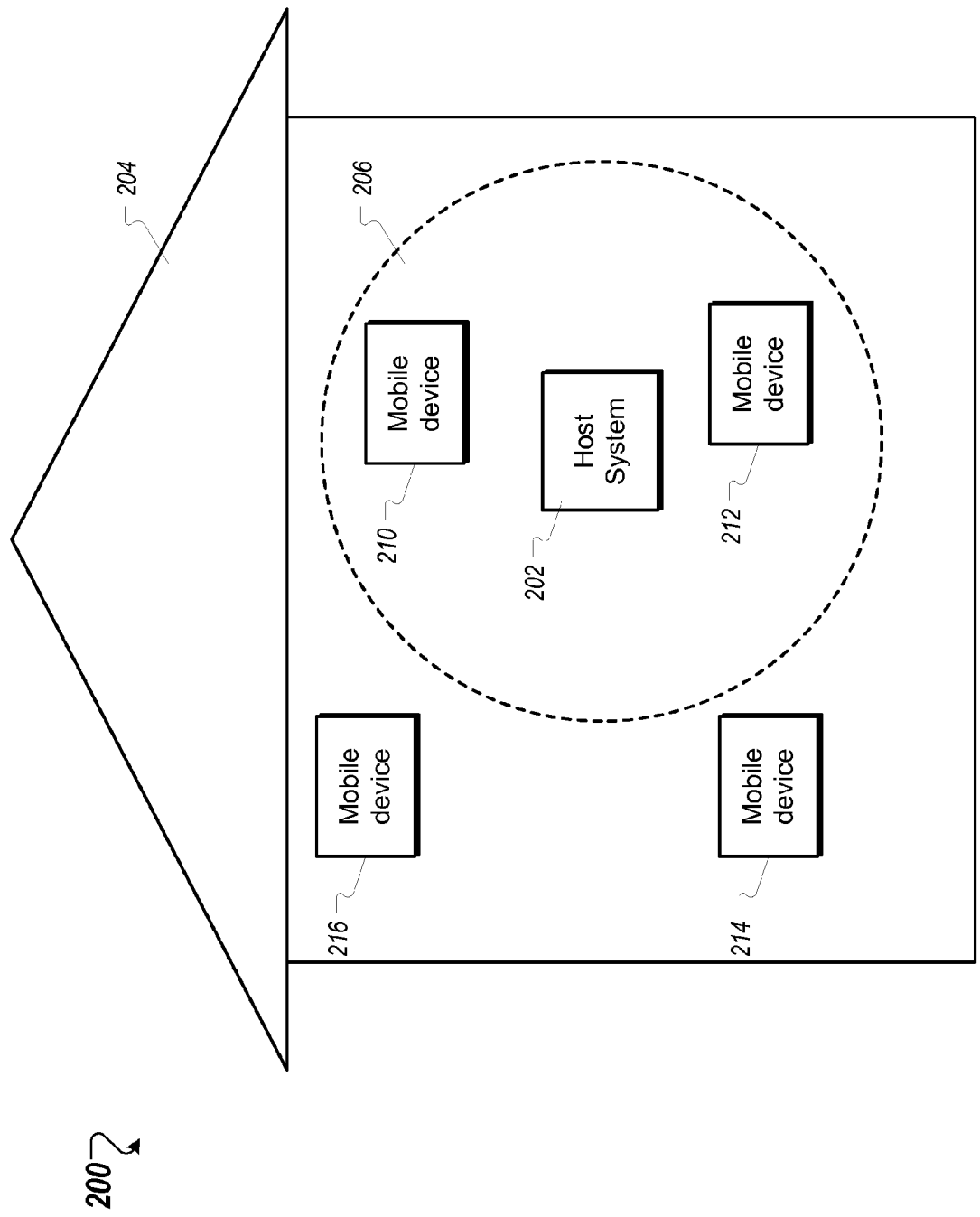
FIG. 2 shows an example system for proximity based media file library synchronization.

FIG. 2 shows an example system 200 for proximity based media file synchronization. The system 200 includes a host system 202 located within a building 204 (e.g., a private residence, restaurant, office building, school, or business). The host system 202 can be, for example, a personal computer (e.g., desktop or laptop computer), a web enabled TV, a media server device (e.g., an Apple TV), a gaming console, or a network server. In some alternative implementations, the host system 202 can be a mobile device, such as, for example, a smart phone, a personal digital assistant (PDA), or a personal gaming device.

In some implementations, the host system 202 includes a media file library and is configured to present media files from the media file library to one or more users. In some implementations, the media files can be digital still images (e.g., photos or pictures stored as jpeg, bitmap, gif, tiff, jfif, or png files), digital video files (e.g., mv4, mpeg, mov, divx, or wmv files), or a combination of both. In other implementations, the media files can additionally include audio files (e.g., mp3, wave, flac, aac, m4p, or wma files). In some implementations, the media files can include slide shows that include multiple digital still images or videos. In some implementations, the media files that make up the media file library can be stored on the host system 202 or on a database associated with the host system 202. Some or all of the media files included in the media file library can be associated with metadata as described above with reference to FIG. 1.

The host system 202 can be connected to a display device for presenting the media files to one or more users. For example, the host system 202 can be connected to a computer monitor or television. As another example, the host system 202 can include one or more built in monitors for displaying media files. In implementations in which the media files are digital still images, the host system 202 can be configured to display the digital still images as a slide show. In some implementations, the host system 202 can play audio while displaying the digital still images. In implementations in which audio is played along with digital still images, or in which the media files include video or audio files, the host system 202 can be connected to speakers for playing audio associated with the media files.

The host system 202 can be configured to detect other computing devices that are within relative proximity to the host system 202. In some implementations, the host system 202 can use a zero configuration networking protocol to detect other computing devices and automatically create an IP network without the need for manual operator intervention. For example, the host system 202 can use zero configuration network configuration software, such as Bonjour, to detect computing devices (e.g., printers, computers, mobile devices) within relative proximity to the host system 202 in order to create a local area network. In some implementations, the host system 202 can detect other devices, and services offered by those devices, using multicast Doman Name System service records.

In some implementations, the host system 202 can define an area in which to detect computing devices to be included in a local area network. For example, the host system 202 can define a media file zone 206 that represents all areas within a specified distance from the host system 202. The host system 202 can identify devices within the media file zone 206 in order to create a local area network. In some implementations, the media file zone 206 can be the maximum communication range for the host system 202. In some implementations, the host system 202 can define an area for the media file zone 206 that is smaller than the maximum communication range for the host system 202 (e.g., within 22 feet of the host system 202). For example, if the host system 202 is located within an apartment, a user of the host system 202 may want to configure the host system 202 to define the media file zone 206 to be within the apartment, so that devices located in adjacent apartments are not included in the network created by the host system 202. In some implementations, the host system 202 can determine if a mobile device is located within the media file zone 206 using signal strength of wireless communications between the host system 202 and the mobile device.

The host system 202 can identify devices located within the media file zone 206 in order to create a local area network as described above. For example, the host system 202 identifies a mobile device 210 and a mobile device 212 as being located within the media file zone 206 and initiates communications with the mobile devices 210 and 212 using a zero configuration network protocol. In some implementations, the communications are wireless communications (e.g., using Bluetooth or WiFi). The mobile devices 210 and 212 can be, for example, mobile phones, PDAs or personal gaming systems. In some alternative implementations, the functions of the mobile devices 210 and 212 can be performed by personal computers or other less mobile computing devices. For example, a desktop computer located within the media file zone 206 can perform functions similar to those described below with respect to the mobile devices 210 and 212.

In some implementations, additional devices, such as a mobile device 214 and a mobile device 216 can be located within the building 204 without being located within the media file zone 206. In some implementations, the mobile devices 214 and 216 are excluded from the local area network created by the host system 202 because they are outside of the media file zone 206.

In some implementations, the mobile devices 210 and 212 can include media file libraries that are complete or partial copies of the media file library of the host system 202. Media files and information associated with media files included in each of the media file libraries included in the mobile devices 210 and 212 and the host system 202 can be synchronized between the devices.

In some implementations, upon initiating communications with the mobile devices 210 and 212, the mobile devices 210 and 212 can provide the host system 202 with device IDs. The device IDs can take the form of hardware ID, network addresses, IP addresses, telephone numbers, or other unique or semi-unique identifiers used to identify devices that are associated with the media file library of the host system 202. For example, the mobile device 210 can provide the host system 202 with a hardware ID for the mobile device 210. In some implementations, the host system 202 can use the received device IDs to determine that the mobile devices 210 and 212 are associated with the media file library of the host system 202.

In some implementations, the mobile devices 210 and 212 can register with the host system 202 in order to be added to the device list 103. For example, the mobile device 210 can indicate to the host system 202 that the mobile device 210 requests to be associated with the media file library of the host system 202. In some implementations, the mobile devices 210 and 212 can be added to a device list 103 of devices associated with the media file library when the mobile devices 210 and 212 are registered with the host system. In some implementations, device IDs received from the mobile devices 210 and 212 can be added to the device list 103.

In some implementations, the mobile devices 210 and 212 must provide credentials in order to register with the host system 202 and be associated with the media file library. For example, the mobile device 212 can provide a user name and password in order to be associated with the media file library and added to the device list 103. As another example, the mobile device 210 can provide a security key in order to be associated with the media file library and added to the device list 103. In some implementations, the mobile devices 210 and 212 need only register with the host system 202 during an initial communication session and do not need to register with the host system 202 during subsequent communication session in order to remain associated with the media file library.

In some implementations, the mobile devices 210 and 212 can access a device list 103 stored on the host system 202 in order to be added to the device list 103. For example, the mobile device 212 can send an access request to the host system 202. The access request can include an indication of the device list 103. The indication can be, for example, a device list ID for the device list 103, a file name for the device list 103, or a media file ID or file name for the media file stored on the host system 202. The host system 202 can provide the device list 103 to the mobile device 212. In some implementations, the host system 202 can lock the device list 103 for editing by the mobile device 212 (e.g., in response to a lock order received from the mobile device 212). The mobile device 212 can modify the device list 103 to include a device ID or other indication of the mobile device 212 and provide the modified device list 103 to the host system 202. The host system 202 can replace a previous version of the device list 103 with the modified device list 103. In some implementations, the mobile device 212 can send a lock release order to the host system 202 to unlock the device list 103 to allow the device list 103 to be accessed by other devices, including the host system 202. In some implementations, the mobile devices 210 and 212 must provide security credentials in order to access the device list 103.

A user of the host system 202 can edit metadata associated with a media file stored in the media file library of the host system 202. For example, the user can add a caption to a digital still image or change a rating of a digital video file. As another example, the user can tag a digital still image with geo-location data indicating where the digital still image was taken. The host system 202 can detect the change to the metadata associated with the media file and identify one or more sync order files in order to propagate the change in metadata to other devices on which the media file is stored. The sync order files can be stored on the host system 202 and each sync order file can be specific to a mobile device. In some implementations, if a sync order file for an identified mobile device does not exist, the host system 202 can generate a sync order file for the mobile device.

In some implementations, the host system 202 can access a device list 103 of devices that are associated with the media file library. For example, the host system 202 can use the device list 103 to determine that the mobile devices 210, 212 and 216 are associated with the media file library. The host system 202 can then access sync order files for the mobile devices 210, 212 and 216 and modify the sync order files to indicate the change to the metadata associated with the media file. In some implementations, the device list 103 can include device IDs for the devices as described above. The host system 202 can use the device IDs for each of the associated devices in order to access sync order files that are specific to the mobile devices.

In some implementations, information included in the sync order files accessed by the host system 202 can include an indication of the media file (e.g., a file name, or file ID), information to allow the recipient devices to apply the change to the metadata associated with the media file to copies of the media file, an indication of the host system 202 (e.g., a device ID for the host system 202), an indication of the media file library of the host system 202 (e.g., a name, media file library ID, or file name for the media file library), or a time stamp to indicate when the sync order file was modified or when the metadata associated with the media file was changed.

The host system 202 can transmit modified sync order files to recipient devices that are within a communication proximity of the host system 202 (e.g., within the media file zone 206). For example, the host system 202 accesses the device list 103 and identifies the mobile devices 210, 212 and 216 as being associated with the media file library. The host system 202 modifies sync order files specific to each of the mobile devices 210, 212 and 216 to indicate the change to the metadata associated with the media file. The host system 202 determines that the mobile devices 210 and 212 are within the media file zone 206 and transmits the sync order files intended for the mobile devices 210 and 212 to the mobile devices 210 and 212 to allow the mobile devices 210 and 212 to apply the change to the metadata associated with the media file within media file libraries stored on the mobile devices 210 and 212.

In some implementations, the sync order files can be transmitted to the mobile devices 210 and 212 in response to access requests received from the mobile devices. For example, the mobile device 210 can send an access request to the host system 202 to request access to the sync order file for the mobile device 210. In some implementations, the mobile device 210 can additionally send a lock order to the host system 202 to request that the sync order file for the mobile device 210 be locked for editing by the mobile device 210. The host system 202 can lock the sync order file and provide the sync order file to the mobile device 210. The mobile device 210 can apply the change to the metadata associated with the media file indicated by the sync order file.

In some implementations, the mobile device 210 can edit the sync order file to remove the indication of the change to the metadata associated with the media file from the sync order file. The mobile device 210 can then provide the modified sync order file to the host system 202. The host system can replace a previous version of the sync order file with the modified sync order file received from the mobile device 210. In instances in which the mobile device 210 has requested that the sync order file be locked for editing, the mobile device 210 can send a lock release order to the host system 202 to unlock the sync order file. The host system 202 can unlock the sync order file in response to receiving the lock release order to allow other devices to access the sync order file.

In some implementations, rather than providing the sync order files to the mobile devices 210 and 212 in response to access requests, the host system 202 can provide the sync order files to the mobile devices 210 and 212 upon determining that the mobile devices 210 and 212 are within the media file zone 206. In some implementations, the host system 202 can provide the sync order files to the mobile devices 210 and 212 at regular intervals.

The host system 202 can store the sync order file intended for the mobile device 216 until it is determined that the mobile device 216 is within the media file zone 206. In some implementations, upon detecting that the mobile device 216 is within the media file zone 206, the host system 202 can establish communications with the mobile device 216 and transmit the sync order file intended for the mobile device 216 to the mobile device 216 to allow the mobile device 216 to apply the change to the metadata associated with the media file within a media file library stored on the mobile device 216. In some implementations, the host system 202 does not provide the sync order file intended for the mobile device 216 until receiving an access request for the sync order file from the mobile device 216. The host system 202 can then provide the sync order file to the mobile device 216 as described above.

In some implementations, the sync order file intended for the mobile device 216 can be updated with additional changes to media files or information associated with media files if additional changes occur after the original modification of the sync order file but prior to the transmission of the sync order file to the mobile device 216. For example, the user of the host system 202 can add an audio effect to an audio file. An indication of the audio effect applied to the audio file can be added to the sync order file intended for the mobile device 216. As another example, the host system 202 can receive an indication of a change to a media file. For example, the mobile device 210 can modify a sync order file associated with the host system 202 to indicate that geo-location data has been added to a digital still image. The host system 202 can access the sync order file and apply the geo-code location data to the indicated digital still image within the media library stored on the host system 202. The host system 202 can additionally add an indication of the geo-location data applied to the digital still image to the sync order file intended for the mobile device 216. Once an access request is received from the mobile device 216, or once the mobile device 216 enters the media file zone 206, the host system 202 can transmit the updated sync order file to the mobile device 216. The mobile device 216 can then apply the changes to media files indicated by the sync order file to the indicated media files within a media file library stored on the mobile device 216.

In some implementations, the mobile device 210 can directly access the sync order file intended for the mobile device 216 and add the indication of the geo-location data applied to the digital still image to the sync order file. For example, the mobile device 210 can access the device list 103 to determine that the mobile device 216 is associated with a media file library that includes the digital still image. The mobile device 210 can then extract a device ID for the mobile device 216 from the device list 103 and include the device ID in an access request sent to the host system 202. The host system 202 can provide the sync order file associated with the mobile device 216 to the mobile device 210 to allow the mobile device 210 to edit the sync order file to include an indication that the geo-location data has been added to the digital still image. The mobile device 210 can provide the modified sync order file to the host system 202. The mobile device 216 can later access the sync order file and apply the changes to media files indicated by the sync order file to the indicated media files within a media file library stored on the mobile device 216.

In some implementations, devices can transmit response messages to the host system 202 upon receiving sync order files from the host system 202 to indicate that the sync have been received by the intended recipient devices. In some implementations, a recipient device does not send a response message until after a change indicated by a sync order file been successfully applied. In some implementations, the recipient device sends a response message to the host system 202 that indicates which changes to media files or metadata associated with media files have been successfully applied. For example, the mobile device 210 can receive a sync order file from the host system 202 that indicates changes to information associated with three different media files. In this example, the mobile device 210 is only able to apply the indicated changes to two of the three media files. The mobile device 210 can send a response message to the host system 202 to indicate the two changes that were successfully applied.

In some implementations, upon receiving a response message from the mobile device 210, the host system 202 can delete an associated indication of a change to a file from a sync order file associated with the mobile device 210. For example, upon receiving a response message from the mobile device 210 indicating that a change to metadata associated with a media file has been successfully applied, the host system 202 can delete the indication of the change from the sync order file that had been transmitted to the mobile device 210. As another example, if a response message is received from the mobile device 210 indicating that a first change to a first media file has been applied while a second change to a second media file has not been applied, the host system 202 can delete information pertaining to the first change from a sync order file intended for the mobile device 210 while leaving information pertaining to the second change in the sync order file intended for the mobile device 210.

In some implementations, if the host system 202 does not receive a response message from a recipient device within a designated time out period, the host system 202 can resend the sync order file intended for the recipient device. For example, the mobile device 210 may not receive a sync order file sent by the host system 202 (e.g., due to network interference, loss of a signal by the mobile device 210, because the mobile device 210 is powered down, or because the mobile device 210 has left the media file zone 206 or a communication range of the host system 202). If the host system 202 does not receive a response message from the mobile device 210 indicating that the mobile device 210 received the sync order file within a designated time out period (e.g., 30 minutes), the host system 202 can resend the sync order file intended for the mobile device 210.

In some implementations, the devices located within the media file zone 206 can modify sync order files stored on the host system 202. For example, a user of the mobile device 212 can apply a rating to a digital still image. The mobile device 212 can detect the change to the digital still image. The mobile device 212 can access a sync order file for the host system 202 and modify the sync order file to indicate the change to the digital still image that is intended for the host system 202. In some implementations, the mobile device 212 can access a device list 103 in order to identify the host system 202 and a device ID for the host system 202 in order to access the sync order file. In some implementations, after editing the sync order file for the host system 202, the mobile device 210 can provide the sync order file to the host system 202. In some implementations, the mobile device 210 can request that the sync order file is locked for editing by the mobile device 210 upon accessing the sync order file. In some such implementations, the mobile device 210 can send a lock release order to the host system 202 after editing the sync order to cause the host system 202 to unlock the sync order file.

The host system 202 can access the sync order file after it is modified by the mobile device 210. In some implementations, the host system 202 can lock the sync order file to prevent it from being accessed by other devices while the host system 202 is accessing the sync order file. The host system 202 can apply the rating indicated by the sync order file to the indicated digital still image within the media file library of the host system 202. In some implementations, the host system 202 can further modify sync order files intended for other devices associated with the indicated digital still image to ensure that the digital still image is synchronized across all devices associated with the digital still image.

In some implementations, two or more different devices can apply changes to the same media file. For example, a digital still image can be included in media file libraries stored on the mobile devices 210 and 212. Users of the mobile devices 210 and 212 can apply two different ratings to the digital still image. The mobile devices 210 and 212 can modify a sync order file associated with the host system 202 to indicate the applied ratings for the digital still image. The host system 202 can access the sync order file and perform conflict resolution as described above with reference to FIG. 1 to determine which change to the rating for the digital still image should be propagated to devices associated with the digital still image to ensure that all version of the digital still image are synchronized.

In some implementations, the host system 202 can determine that a synchronization order intended for a device is too large. In some such implementations, the host system 202 can send a download order to the device that indicates that one or more media files are to be downloaded by the device. For example, a user of the host system 202 can edit a digital video file such that the changes to the digital video file are substantial. The host system 202 can identify the mobile device 212 as being associated with the digital video file. In some instances, the host system 202 can determine that the memory space required to indicate the changes to the digital video file exceeds a predetermined threshold. In such instances, the host system 202 can transmit a download order to the mobile device 212 indicating that the mobile device 212 should download the current version of the digital video file from the host system 202. In some implementations, the download order can be included in a sync order file intended for the mobile device 212. For example, the host system 202 can modify the sync order file for the mobile device 212 to include the download order. In some implementations, the host system 202 can replace one or more indications of changes to media files with the download order within the sync order file.

As another example, several changes to media files included in the media file library of the host system 202 can occur while the mobile device 212 is outside of the media file zone 206. The host system 202 can generate a sync order file intended for the mobile device 212 that indicates each of the changes. In this example, the host system 202 can determine if the number of changes to media files indicated by the sync order file intended for the mobile device 212 exceeds a predetermined threshold (e.g., 20). If the number off changes to media files indicated by the sync order file intended for the mobile device 212 exceeds the threshold, the host system 202 can transmit a download order to the mobile device 212 indicating that the mobile device 212 should download current versions of the media files once the mobile device 212 has entered the media file zone 206. In some implementations, the host system 202 can determine the number of changes indicated for each media file, and only send a download order when the number of changes associated with a single media file exceeds a predetermined threshold. In some implementations, the host system 202 can send a down load order to the mobile device 212 if the size of the sync order file or the size of the indications of the changes to the media files included in the sync order file exceeds a predetermined threshold. In some implementations, the download order can be included in the sync order file. In some implementations, indications of changes to media files within the sync order file can be replaced by the download order.

In some implementations, if the number of changes to media files indicated by a sync order file intended for a device exceeds a threshold, or the size of a sync order file intended for a device exceeds a threshold, the sync order file can be replaced by a download order indicating to the device that the entire media file library of the host system 202 should be re-downloaded by the device.

Figure 3:
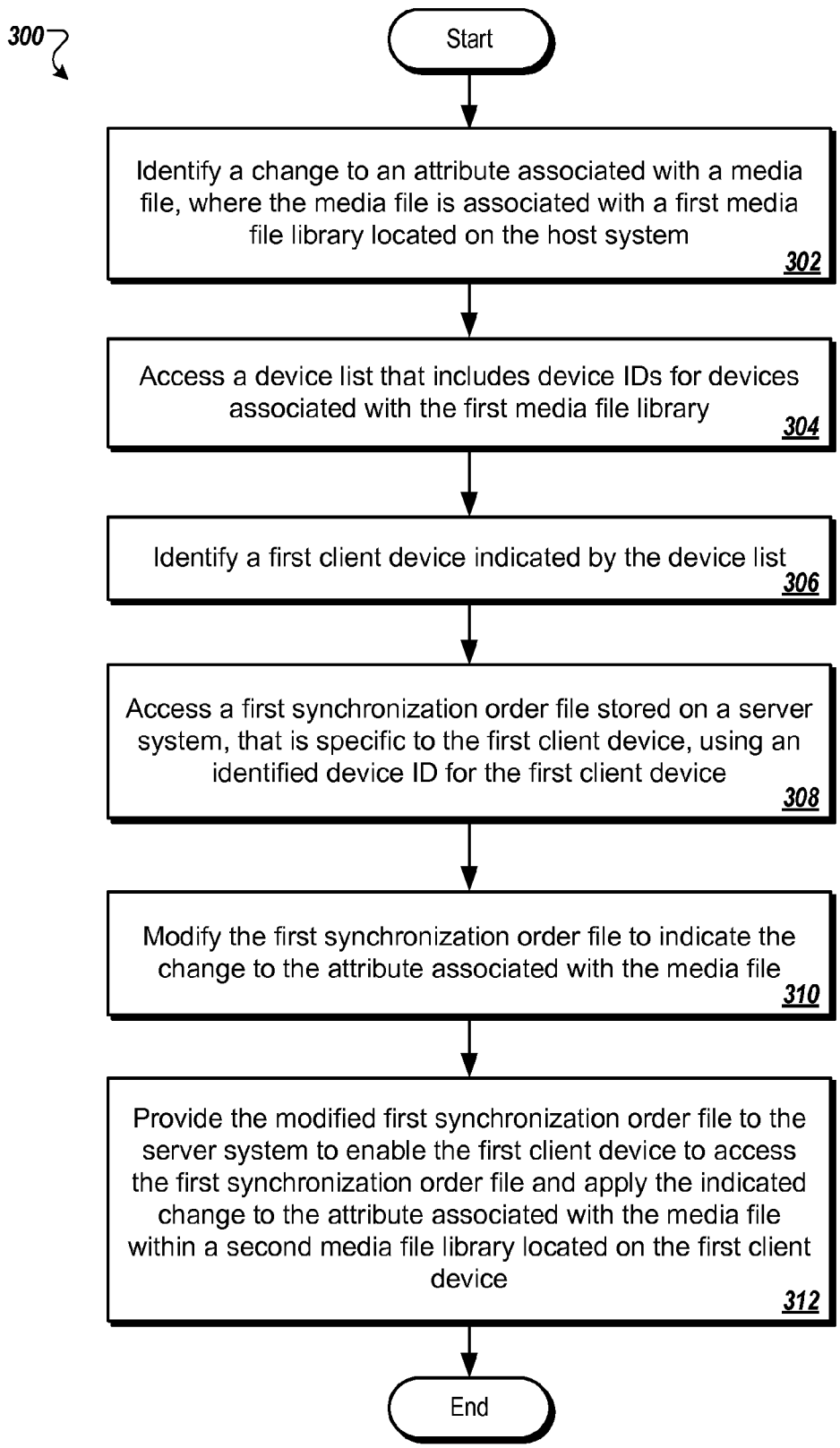
FIG. 3 is a flow diagram of an example process for synchronizing media file libraries stored on electronic devices.

FIG. 3 is a process flow diagram showing an example process for synchronizing media file libraries stored on electronic devices. A change to an attribute associated with a media file is identified, where the media file is associated with a first media file library located on the host system (302). For example, a user of a host system (e.g., the host system 102 of FIG. 1) can modify metadata associated with a media file. For example, the user can apply a rating to a photo. As another example, the user can apply a filter effect to a photo. As yet another example, the user can change an artist attribute for a media file having a file name "awesome_song.mp3" to "Example Band." In some implementations, the attribute associated with the media file can include captions, tags that indicate persons pictured in images or videos, rating information, geo-location data (e.g., latitude and longitude, GPS data, or city and country data), date and/or time stamps, image resolution information, file size information, visual or audio effect information, titles, chapter titles, run time, artist name(s), actor names, names of other persons associated with the media file (e.g., director, producer, photographer), television series names, descriptions, genres, artwork, album titles, or song titles.

A device list 103 that includes device IDs for devices associated with the first media file library can be accessed (304). The device list 103 can be stored, for example, on a server system, such as the server 104 of FIG. 1. The device list 103 can include listings of all devices associated with particular media files or media file libraries. The device list 103 can be identified using a media file ID, media file name, media file library ID, or media file library name. The server system can provide the device list 103 to the host system. In some implementations, the server system can lock the device list 103 to allow the host system exclusive access to the device list 103 while the device list 103 is locked. In some implementations, the server system can lock the device list 103 in response to a lock order sent by the host system. In some implementations, the device list 103 can be stored on the host system. In some implementations, the device list 103 can include device IDs for devices associated with the media file or the first media file library.

A first client device indicated by the device list 103 can be identified (306). For example, the device list 103 can be used to identify a device ID for a client device (e.g., the client device 110 of FIG. 1) that is associated with the media file library.

A first synchronization order file stored on a server system, that is specific to the first client device, is accessed using an identified device ID for the first client device (308). For example, the host system can send an access request to the server system to request a sync order file for the first client device. In some implementations, the device ID for the first client device can be included in the access request. The server system can identify the requested sync order file using the device ID and provide the sync order file to the host system. In some implementations, the host system can identify a file name or sync order file ID for the sync order file using the device ID. The host system can then include the file name or sync order file ID in the access request. In some implementations, the server system can lock the sync order file for editing by the host system (e.g., in response to a lock order received from the host system). Locking the sync order file can prevent other devices from accessing the sync order file while the host system is accessing the sync order file.

The first synchronization order file is modified to indicate the change to the attribute associated with the media file (310). For example, the first sync order file can be modified to indicate that the artist attribute for the media file having the file name "awesome_song.mp3" has been changed to "Example Band" can be generated. The first sync order file can be modified to include additional information, such as a time stamp of when the change to the media file occurred, or a device ID for the host system. In some implementations, the first sync order file can include indications of additional changes to the media file having the file name "awesome_song.mp3" or changes to other media files. The indications of additional changes can be added by the host system, or can have been already included in the first sync order file prior to the host system accessing the first sync order file. In some implementations, some of the additional changes can have been previously added to the first sync order file by devices other than the host system.

The modified first synchronization order file can be provided to the server system to enable the first client device to access the first synchronization order file and apply the indicated change to the attribute associated with the media file within a second media file library located on the first client device (312). For example, the first client device can access the first sync order file on the server system. In some implementations, the server system can provide the first sync order file to the first client device in response to an access request received from the first client device. In some implementations, the server system can lock the first sync order file to prevent devices other than the first client device from accessing the first sync order file while the first client device is accessing the first sync order file. In some implementations, the lock can be initiated in response to a lock order received from the first client device.

The first client device can apply the change to the attribute associated with the media file as indicated by the first sync order file. For example, the first client device can change the artist name of the file "awesome_song.mp3" to "Example Band." In some implementations, the first client device can change additional attributes associated with the file "awesome_song.mp3" or other media files as indicated by the first sync order file. In some implementations, the second media file library is a mirror of the first media file library. In some implementations, the second media file library contains a subset of the media files contained in the first media file library.

Figure 4:
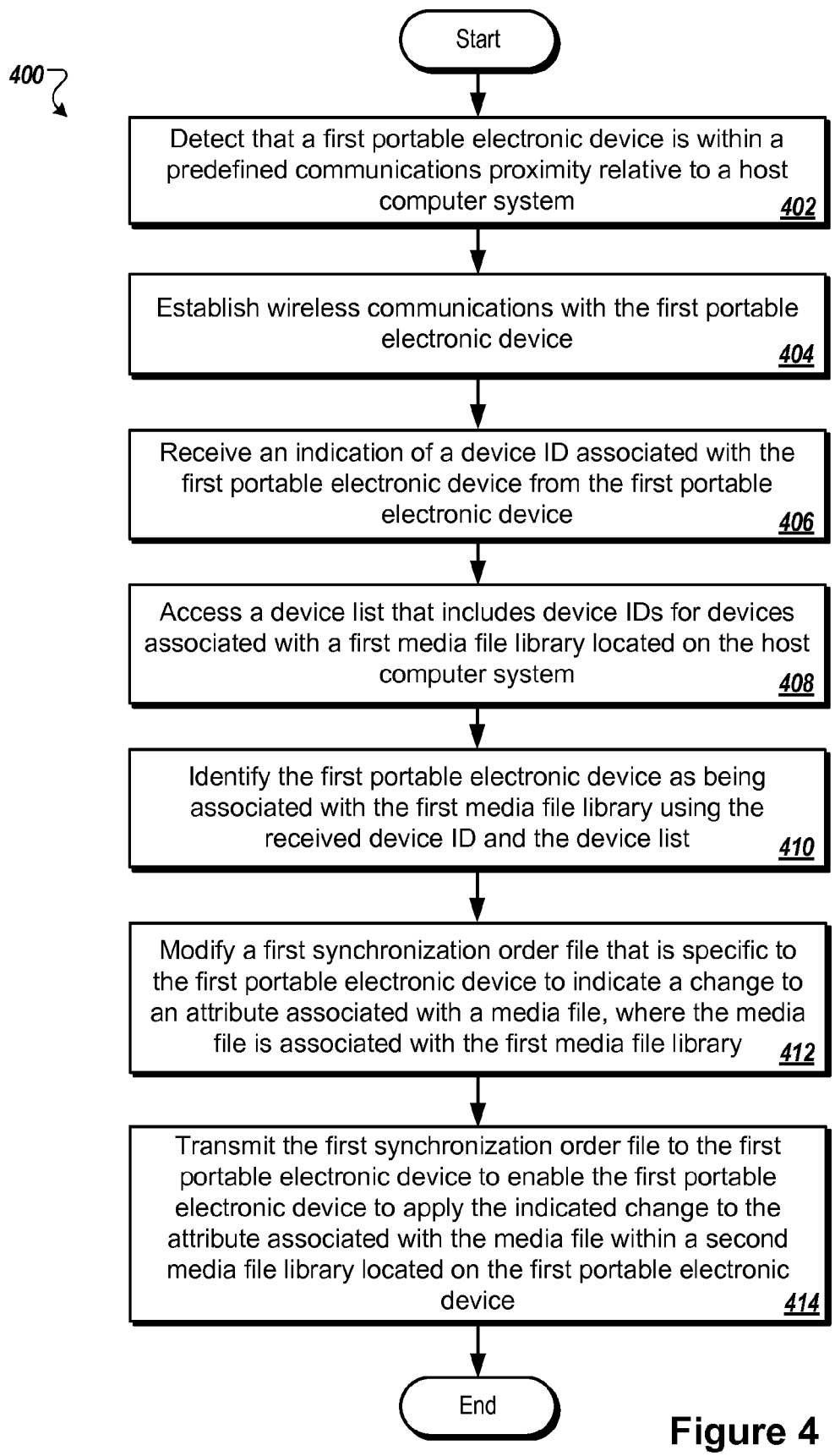
FIG. 4 is a flow diagram of an example process for synchronizing media file libraries stored on electronic devices located within a communications proximity.

FIG. 4 is a process flow diagram showing an example process 400 for synchronizing media file libraries stored on electronic devices located within a communications proximity. A system or apparatus can detect that a first portable electronic device is within a predefined communications proximity relative to a host computer system (402). For example, the host computer system (e.g., the host system 202 of FIG. 2) can use a zero configuration wireless networking protocol or software (e.g., Bonjour) to determine if any portable electronic devices (e.g., the mobile devices 210 and 212 of FIG. 2) are within a predefined communications proximity of the host computer system. In some implementations, the predefined communications proximity can be the maximum communications range for the host computer system. In other implementations, the host computer system can define a predefined communications proximity that is less than the maximum communications range for the host computer system. In some implementations, the host computer system can measure the signal strength of wireless communications with the plurality of portable electronic devices to determine that the portable electronic devices are within the predefined communications proximity. The host computer system can be, for example, a personal computer (e.g., desktop or laptop computer), a web enabled TV, a media server device (e.g., an Apple TV), a gaming console, or a network server. In some implementations, the host computer system can alternatively be a mobile device, such as a mobile phone, PDA, or personal gaming device.

Wireless communications with the first portable electronic can be established (404). For example, the host computer system can establish network connections with the portable electronic devices using zero configuration networking software or by implementing a zero configuration networking protocol. In some implementations, the host computer system can use a network configuration protocol that requires some manual configuration.

An indication of a device ID associated with the first portable electronic device can be received from the first portable electronic device (406). For example, after communications have been established with the first portable electronic device, the first portable electronic device can send a transmission to the host computer that indicates a device ID for the first portable electronic device. The device ID can take the form of a hardware ID, network address, IP address, telephone number, or other unique or semi-unique identifier.

A device list 103 that includes device IDs for devices associated with a first media file library located on the host computer system can be accessed (408). For example, the first media file library (e.g., the media file library 108 of FIG. 1) can be stored in memory of the host computer system. In some implementations, devices can be mapped to media file libraries using device IDs for the devices and file names or media file library IDs for one or more media file libraries.

The first portable electronic device can be identified as being associated with the first media file library using the received device ID and the device list 103 (410). For example, the first portable electronic device may have previously registered with the host computer system in order to be associated with the first media file library and included in the device list 103. In some implementations, the first portable electronic device must provide credentials in order to register with the host computer system and be associated with the media file library. For example, the first portable electronic device can provide a user name and password in order to be associated with the first media file library and added to the device list 103. As another example, the first portable electronic device can provide a security key in order to be associated with the first media file library and added to the device list 103. In some implementations, the first portable electronic device can access the device list 103 and modify the device list 103 in order to add the device ID for the first portable electronic device to the device list 103 prior to the host computer system accessing the device list 103.

A first synchronization order file that is specific to the first portable electronic device indicating a change to an attribute associated with a media file can be modified, where the media file is associated with the first media file library (412). For example, a user of the host system can change an attribute associated with a digital still image and an indication of the change can be added to the first sync order file by the host computer system. As another example, the host computer system can access a sync order file associated with the host computer system that indicates a change to an attribute associated with a media file. The host computer system can propagate the change indicated by the accessed sync order file by including an indication of the change indicated by the accessed sync order file in the first sync order file.

As another example, a sync order file can be modified to indicate that a rating attribute for a media file having the file name "party_pictures_12.jpg" has been changed to "5." In some implementations, the first sync order file can include indications of additional changes to the media file having the file name "party_pictures_12.jpg" or changes to other media files.

The first synchronization order file can be transmitted to the first portable electronic device to enable the first portable electronic device to apply the indicated change to the attribute associated with the media file within a second media file library located on the first portable electronic device (414). For example, the first portable electronic device can change the rating attribute of the file "party_pictures_12.jpg" to "5." In some implementations, the first portable electronic device can change additional attributes associated with the file "party_picture_12.jpg" or other media files as indicated by the first sync order file. In some implementations, the second media file library is a mirror of the first media file library. In some implementations, the second media file library contains a subset of the media files contained in the first media file library.

In some implementations, the first sync order file can be transmitted to the first client device in response to an access request received by the host computer system. In some implementations, the host computer system can lock the first sync order file for editing by the first client device. For example, the first client device can send a lock order to the host computer system requesting that the first sync order file be locked for editing by the first client device.

Figure 5:
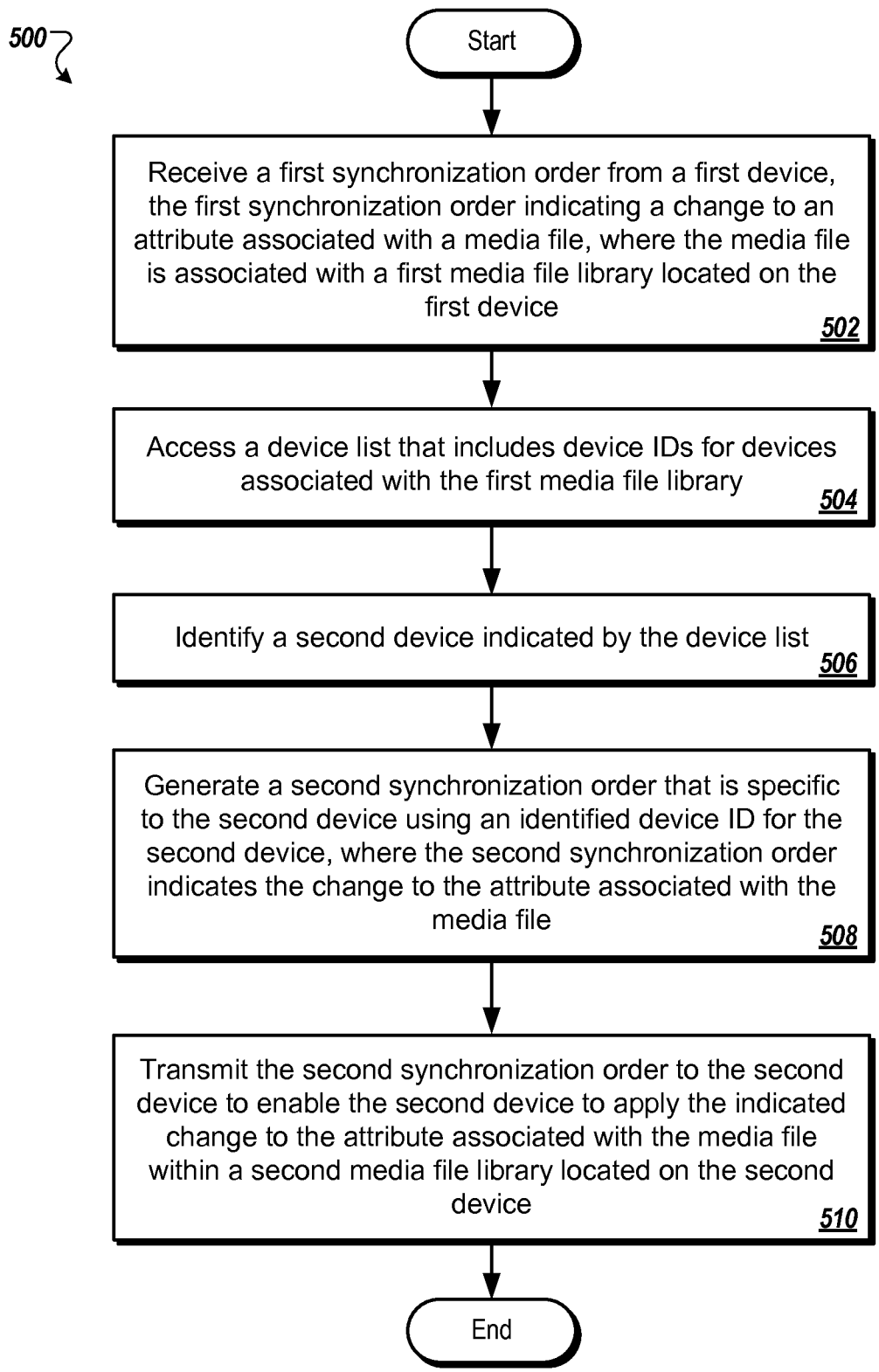
FIG. 5 is a flow diagram of an example process for synchronizing media file libraries stored on electronic devices using an active server.

FIG. 5 is a process flow diagram showing an example process for synchronizing media file libraries stored on electronic devices in a system that includes an active server. A first synchronization (sync) order indicating a change to an attribute associated with a media file can be received from a first device, where the media file is associated with a first media file library located on the first device (502). For example, a server system (e.g., the server 104 of FIG. 1) can receive a synchronization order from a first device having a media file library. The synchronization order can indicate a change to an attribute associated with a media file stored as part of the media file library. For example the sync order file can indicate that an artist attribute for a media file having a file name "awesome_song.mp3" has been changed to "Example Band." In some implementations, the attribute associated with the media file can include captions, tags that indicate persons pictured in images or videos, rating information, geo-location data (e.g., latitude and longitude, GPS data, or city and country data), date and/or time stamps, image resolution information, file size information, visual or audio effect information, titles, chapter titles, run time, artist name (s), actor names, names of other persons associated with the media file (e.g., director, producer, photographer), television series names, descriptions, genres, artwork, album titles, or song titles.

A device list 103 that includes device IDs for devices associated with the first media file library can be accessed (504). For example, the sync order file can include a file name or media file library ID for the media file library. The device list 103 can include listings of all devices associated with particular media file names or media file library IDs. The received file name or media file library ID can be used to identify devices that are associated with the media file library indicated by the sync order file. As another example, the sync order file can include an indication of the media file (e.g., a file name). The device list 103 can be used to identify devices that are associated with the media file. In some implementations, device IDs for devices associated with the media file library indicated by the sync order file can be extracted from the device list 103.

A second device indicated by the device list 103 can be identified (506). For example, the device list 103 can be used to identify a device ID for a client device (e.g., the client device 110 of FIG. 1) that is associated with the media file library.

A second synchronization order that is specific to the second device can be generated using an identified device ID for the second device, where the second synchronization order indicates the change to the attribute associated with the media file (508). For example, a sync order file that indicates that the artist attribute for the media file having the file name "awesome_song.mp3" has been changed to "Example Band" can be generated. The sync order file can be generated so as to be specific to the intended recipient device using the device ID for the recipient device. In some implementations, the sync order file can include indications of additional changes to the media file having the file name "awesome_song.mp3" or changes to other media files. The additional changes can be indicated by sync order files received from the first device or other devices and added to the sync order file intended for the second device.

The second synchronization order can be transmitted to the second device to enable the second device to apply the indicated change to the attribute associated with the media file within a second media file library located on the second device (510). For example, the second device can change the artist name of the file "awesome_song.mp3" to "Example Band." In some implementations, the second device can change additional attributes associated with the file "awesome_song.mp3" or other media files as indicated by the second sync order file. In some implementations, the second media file library is a mirror of the first media file library. In some implementations, the second media file library contains a subset of the media files contained in the first media file library.

Figure 6:
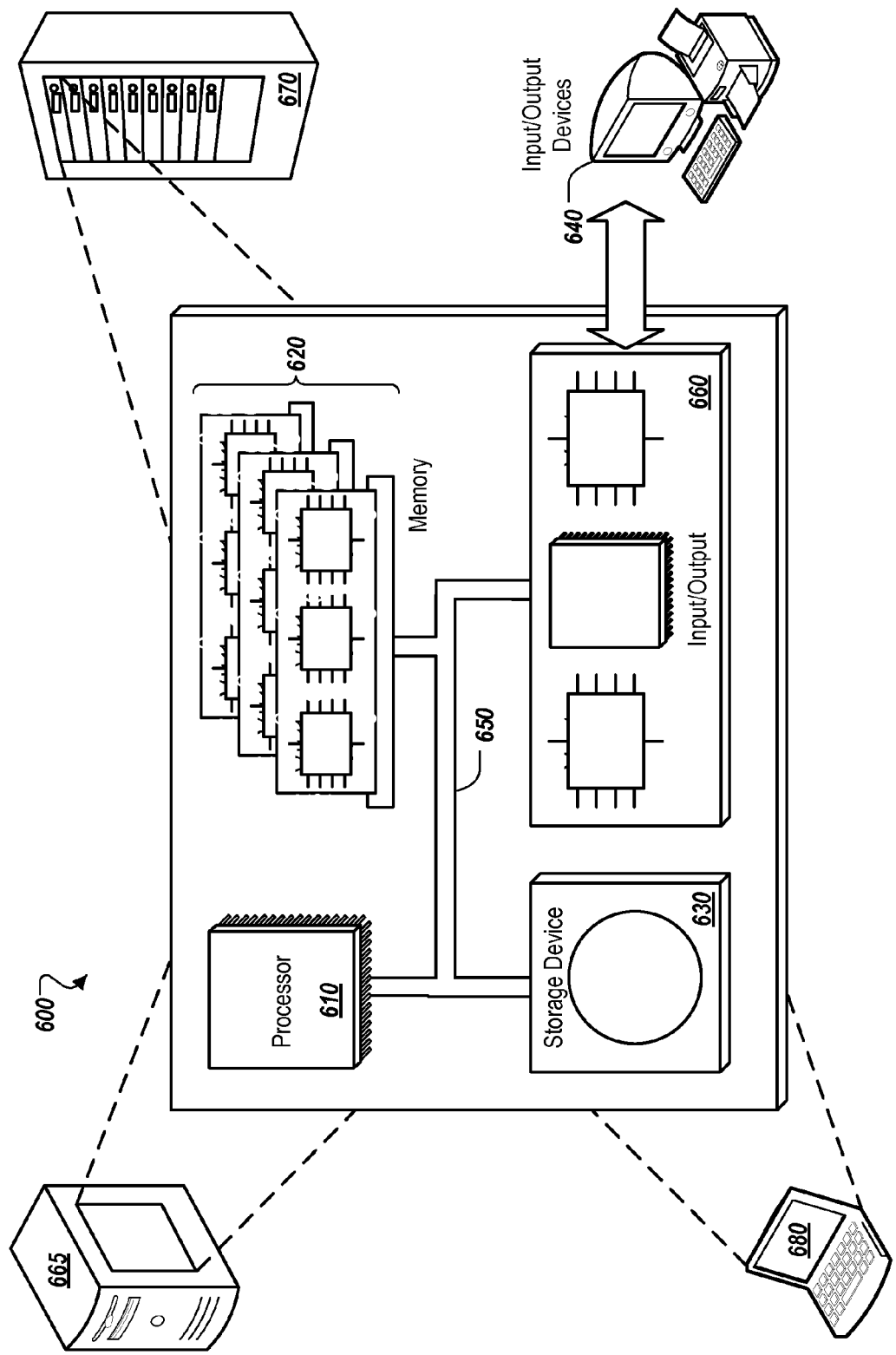
FIG. 6 is a block diagram of a computing device and system that can be used in connection with computer-implemented methods and systems described in this document.

FIG. 6 is a block diagram of a computing device and system that can be used, e.g., to synchronize media file libraries across multiple devices. Computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 600 includes a processor 610, memory 620, a storage device 630, a high-speed interface 650 connecting to memory 620. The computing device can also include high-speed expansion ports (not shown), and a low speed interface (not shown) connecting to low speed bus (not shown) and storage device 630. Each of the components 610, 620, 630, 650, and 620, are interconnected using various busses, and can be mounted on a common motherboard or in other manners as appropriate. The processor 610 can process instructions for execution within the computing device 600, including instructions stored in the memory 620 or on the storage device 630 to display graphical information for a GUI on an external input/output device, such as display 640 coupled to an input/output interface 660. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

The memory 620 stores information within the computing device 600. In one implementation, the memory 620 is a computer-readable medium. In one implementation, the memory 620 is a volatile memory unit or units. In another implementation, the memory 620 is a non-volatile memory unit or units.

The storage device 630 is capable of providing mass storage for the computing device 600. In one implementation, the storage device 630 is a computer-readable medium. In various different implementations, the storage device 630 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The computer- or machine-readable medium can include the memory 620, the storage device 630, or memory on processor 610.

The high speed controller 650 manages bandwidth-intensive operations for the computing device 600, while the low speed controller manages lower bandwidth-intensive operations. Such allocation of duties is exemplary only. In one implementation, the high-speed controller 650 is coupled to memory 620, display 640 (e.g., through a graphics processor or accelerator), and to high-speed expansion ports (not shown), which can accept various expansion cards (not shown). In the implementation, low-speed controller (not shown) is coupled to storage device 630 and low-speed expansion port (not shown). The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 665, or multiple times in a group of such servers. It can also be implemented as part of a rack server system 670. In addition, it can be implemented in a personal computer such as a laptop computer 680.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer or machine readable medium for execution by, or to control the operation of, data processing apparatus. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application. A number of embodiments have been described. Nevertheless, it will be understood that various modifications are optionally made without departing from the spirit and scope of this disclosure. Accordingly, other embodiments are within the scope of the following claims.

What is claimed is:

1. A method performed by one or more processors, comprising:
   identifying a change to an attribute associated with a media file in a first media file library located on a host system;
   accessing, in response to the identified change, a client device list, the client device list comprising a plurality of device IDs;
   identifying, in the client device list, a first device ID for a first client device upon which the identified change should be effected;
   retrieving a first synchronization order file specific to the identified first client device and stored on a server system;
   modifying the first synchronization order file to indicate the identified change to the attribute associated with the media file; and
   providing the modified first synchronization order file to the server system to enable the first client device to access the first synchronization order file and apply the indicated change to the attribute associated with the media file within a second media file library located on the first client device,
   wherein the acts of identifying the change, accessing the client device list, identifying the first device ID, and retrieving the first synchronization order file are performed without direct communication to the first client device and
   wherein the indicated change to the attribute associated with the media file is applied within the second media file library without direct communication between the first client device and the host system.

2. The method of claim 1, wherein accessing the device list includes retrieving the device list from the server system.

3. The method of claim 2, wherein accessing the device list further includes transmitting a lock order to the server system to lock the device list for editing.

4. The method of claim 1, wherein retrieving the first synchronization order file includes transmitting a lock order to the server system to lock the first synchronization order file.

5. The method of claim 4, wherein providing the modified first synchronization order file to the server system includes transmitting a lock release order to the server system to unlock the first synchronization order file.

6. The method of claim 1, further comprising:
   transmitting a notification to the first client device notifying the first client device to access the first synchronization order file.

7. The method of claim 1, further comprising:
   receiving an indication of the first synchronization order file having been received by the first client device; and
   removing the indication of the change to the attribute associated with the media file from the first synchronization order file responsive to receiving the indication of the first synchronization order file having been received.

8. The method of claim 1, further comprising:
   prior to providing the modified first synchronization order file, identifying a change to an attribute associated with a second media file; and
   updating the first synchronization order file to include an indication of the change to the attribute associated with the second media file.

9. The method of claim 1, further comprising:
   accessing a second synchronization order file stored on the server system, that is specific to the host system, where the second synchronization order file includes an indication of a change to an attribute associated with a second media file, where the second media file is associated with both the first and second media file libraries; and
   applying the indicated change to the attribute associated with the second media file within the first media file library.

10. The method of claim 9, wherein accessing the second synchronization order file includes transmitting a lock order to the server system to lock the second synchronization order file.

11. The method of claim 9, further comprising:
   modifying the second synchronization order file to remove the indication of the change to the attribute associated with the second media file from the second synchronization order file; and providing the modified second synchronization order file to the server system.

12. The method of claim 9, wherein the indication of the change to the attribute associated with the second media file is added to the second synchronization order file by the first client device.

13. The method of claim 9, wherein the second synchronization order file includes indications of changes to attributes associated with media files that have been added to the second synchronization order file by at least two devices, the two devices being different from the host system.

14. The method of claim 1, wherein the change to the attribute constitutes a change to metadata associated with the media file.

15. The method of claim 1, further comprising:
retrieving a synchronization order file for each device indicated by the device list as being a device upon which the identified change should be effected;
modifying each of the retrieved synchronization order files to indicate the change to the attribute associated with the media file; and
providing the modified synchronization order files to the server system to enable the respective associated devices to access their respective modified synchronization order files and apply the indicated change to the attribute associated with the media file within a media file library located on each device.

16. The method of claim 1, further comprising:
determining that a value associated with the first synchronization order file exceeds a predetermined threshold; and
in response to the determining, generating a download order that is specific to the first client device, where the download order indicates that one or more media files are to be downloaded by the first client device.

17. The method of claim 16, wherein determining that a value associated with the first synchronization order file exceeds a predetermined threshold includes determining that a number of changes to attributes associated with media files included in the first synchronization order file exceeds a predetermined threshold.

18. The method of claim 16, wherein determining that a value associated with the first synchronization order file exceeds a predetermined threshold includes determining that an amount of memory storage space required to store the first synchronization order file exceeds a predetermined threshold.

19. The method of claim 1, wherein the first synchronization order file includes one or more additional indications of changes to attributes associated with one or more media files where the one or more additional indications of changes to attributes associated with the one or more media files were added to the first synchronization order file by a plurality of devices other than the host system.

20. The method of claim 1, further comprising:
determining that an indication of a receipt of the first synchronization order file by the server system has not been received within a predetermined time-out period; and
re-transmitting the first synchronization order file to the server system responsive to the determining.

21. A method performed by one or more processors, comprising:
identifying a change to an attribute associated with a media file in a first media file library located on a host computer system;
accessing, in response to the identified change, a device list, the device list comprising a plurality of device IDs;
identifying, in the device list, a first device ID for a first device upon which the identified change should be effected;
modifying a first synchronization order file that is specific to the first device to indicate the change to the attribute associated with the media file;
detecting that the first device is within a predefined communications proximity relative to the host computer system;
establishing wireless communications with the first device; and
transmitting, in response to detecting that the first device is within the predefined communications proximity, the first synchronization order file to the first device to enable the first device to apply the indicated change to the attribute associated with the media file within a second media file library located on the first device,
wherein the acts of identifying the change, accessing the device list, identifying the first device ID, and modifying the first synchronization order file are performed without direct communication to the first device.

22. The method of claim 21, further comprising:
receiving security information from the first device; and
using the received security information to determine that the first device is permitted to receive synchronization order files associated with the first media file library.

23. The method of claim 21, further comprising:
receiving a modified first synchronization order file from the first device, where the indication of the change to the attribute associated with the media file has been removed from the modified first synchronization order file; and
storing the modified first synchronization order file in a memory of the host computer system.

24. The method of claim 21, further comprising:
prior to transmitting the first synchronization order file, receiving an access request from a second device; and
allowing the second device to modify the first synchronization order file in response to the received access request, where the second device modifies the first synchronization order file to indicate a change to an attribute associated with a second media file.

25. The method of claim 21, further comprising:
receiving an access request from the first device, where the access request indicates a second synchronization order file;
allowing the first device to modify the second synchronization order file to indicate a change to an attribute associated with a second media file in response to the received access request, where the second media file is associated with both the first and second media file libraries;
accessing the second synchronization order file to identify the indication of the change to the attribute associated with the second media file; and
applying the indicated change to the second media file within the first media file library.

26. The method of claim 21, further comprising:
accessing a synchronization order file for each device indicated by the device list as being a device upon which the identified change should be effected;
modifying each of the accessed synchronization order files to indicate the change to the attribute associated with the media file; and
transmitting the modified synchronization order files to each of the respective associated devices that is within the predefined communications proximity to enable each device to apply the indicated change to the attribute associated with the media file within a media file library located on each device.

27. The method of claim 21, further comprising:
determining that a value associated with the first synchronization order file exceeds a predetermined threshold;
in response to the determining, generating a download order that is specific to the first device, where the download order indicates that one or more media files are to be downloaded by the first device; and
transmitting the download order to the first device.

28. The method of claim 27, wherein determining that a value associated with the first synchronization order file exceeds a predetermined threshold includes determining that a number of changes to attributes associated with media files included in the first synchronization order file exceeds a predetermined threshold.

29. The method of claim 27, wherein determining that a value associated with the first synchronization order file exceeds a predetermined threshold includes determining that an amount of memory storage space required to store the first synchronization order file exceeds a predetermined threshold.

30. A system configured to facilitate synchronization of media files among two or more devices, the system comprising:
an intermediate server configured to host one or more synchronization order files that facilitate synchronization of a host media library with at least one other media library;
one or more client devices each configured to maintain a client media library and to communicate with the intermediate server; and
a host device that hosts the host media library and that is configured to execute processes to perform the following:
detect that information associated with one or more media files within the host media library has changed;
access, in response to the detected change, a client device list, the client device list comprising a plurality of device IDs;
identify, in the device list, a first device ID for a first client device of the one or more client devices upon which the identified change should be effected;
communicate with the intermediate server to temporarily prevent a first synchronization order file of the one or more synchronization order files from being altered by entities other than the host device, wherein the first synchronization order file is specific to the first client device;
modify the first synchronization order file to reflect the detected changed information; and
transmit the modified first synchronization order file to the intermediate server to allow the first synchronization order file to be accessed by the first client device,
wherein the acts of detecting the change, accessing the client device list, identifying the first device ID, and modifying the first synchronization order file are performed without direct communication to the first device.

31. A non-transitory program storage device comprising machine readable instructions that when executed cause one or more machines to:
identify a change to an attribute associated with a media file in a first media file library located on a host system;
access, in response to the identified change, a client device list to identify one or more device IDs for client devices upon which the identified change should be effected;
identify, in the client device list, a first device ID for a first client device upon which the identified change should be effected
retrieve a first synchronization order file specific to the first client device from a server system using the first device ID;
modify the first synchronization order file to indicate the change to the attribute associated with the media file; and
provide the modified first synchronization order file to the server system to enable the first client device to access the first synchronization order file and apply the indicated change to the attribute associated with the media file within a second media file library located on the first client device,
wherein the acts of detecting the change, accessing the client device list, identifying the first device ID, and modifying the first synchronization order file are performed without direct communication to the first device.

* * * * *